US006975869B1

(12) United States Patent
Billon

(10) Patent No.: US 6,975,869 B1
(45) Date of Patent: Dec. 13, 2005

(54) METHOD AND APPARATUS FOR SELECTING PARAMETERS IN A CELLULAR RADIO COMMUNICATION NETWORK

(75) Inventor: Thierry Billon, Puteaux (FR)

(73) Assignee: Nortel Matra Cellular, Guyancourt (FR)

( * ) Notice: Subject to any disclaimer, the term of this patent is extended or adjusted under 35 U.S.C. 154(b) by 0 days.

(21) Appl. No.: 09/720,514

(22) PCT Filed: Jun. 23, 1999

(86) PCT No.: PCT/FR99/01505

§ 371 (c)(1),
(2), (4) Date: Feb. 28, 2001

(87) PCT Pub. No.: WO00/01181

PCT Pub. Date: Jan. 6, 2000

(30) Foreign Application Priority Data

Jun. 26, 1998 (FR) .................................. 98 08150

(51) Int. Cl.⁷ ............................................. H04Q 7/34
(52) U.S. Cl. .............................. 455/452.1; 455/67.11; 455/561
(58) Field of Search ............................ 455/435.2, 450, 455/452.1, 452.2, 436–437, 453, 448, 455, 455/67.11, 561, 509, 513; 370/329, 331

(56) References Cited

U.S. PATENT DOCUMENTS

| | | | | |
|---|---|---|---|---|
| 5,832,086 A | * | 11/1998 | Rosauer | 380/273 |
| 6,108,321 A | * | 8/2000 | Anderson et al. | 370/329 |
| 6,119,011 A | * | 9/2000 | Borst et al. | 455/452.2 |
| 6,163,694 A | * | 12/2000 | Lind et al. | 455/435.3 |
| 6,317,600 B1 | * | 11/2001 | Salonaho et al. | 455/453 |
| 6,477,376 B1 | * | 11/2002 | Carter | 455/446 |
| 6,496,700 B1 | * | 12/2002 | Chawla et al. | 455/435.2 |

FOREIGN PATENT DOCUMENTS

| | | | | |
|---|---|---|---|---|
| WO | WO 96/06512 | * | 2/1996 | H04Q 7/38 |
| WO | WO 98/10615 | * | 3/1998 | H04Q 7/38 |

* cited by examiner

Primary Examiner—Nick Corsaro
Assistant Examiner—Brandon J. Miller
(74) Attorney, Agent, or Firm—DLA Piper Rudnick Gray Cary US LLP

(57) ABSTRACT

For each base station serving mobile stations in a cell, measurements carried out on radio channels in the cell are used to obtain values of a quantity compared to one or several associated parameters in a procedure managing radio resources allocated to the mobile stations. A statistic of the obtained values the quantity is maintained. The value of each associated parameter for the cell is adapted such that, according to the statistic, a predetermined fraction of the values of the quantity obtained from the measurements are higher than the associated parameter value.

36 Claims, 4 Drawing Sheets

FIG.3.
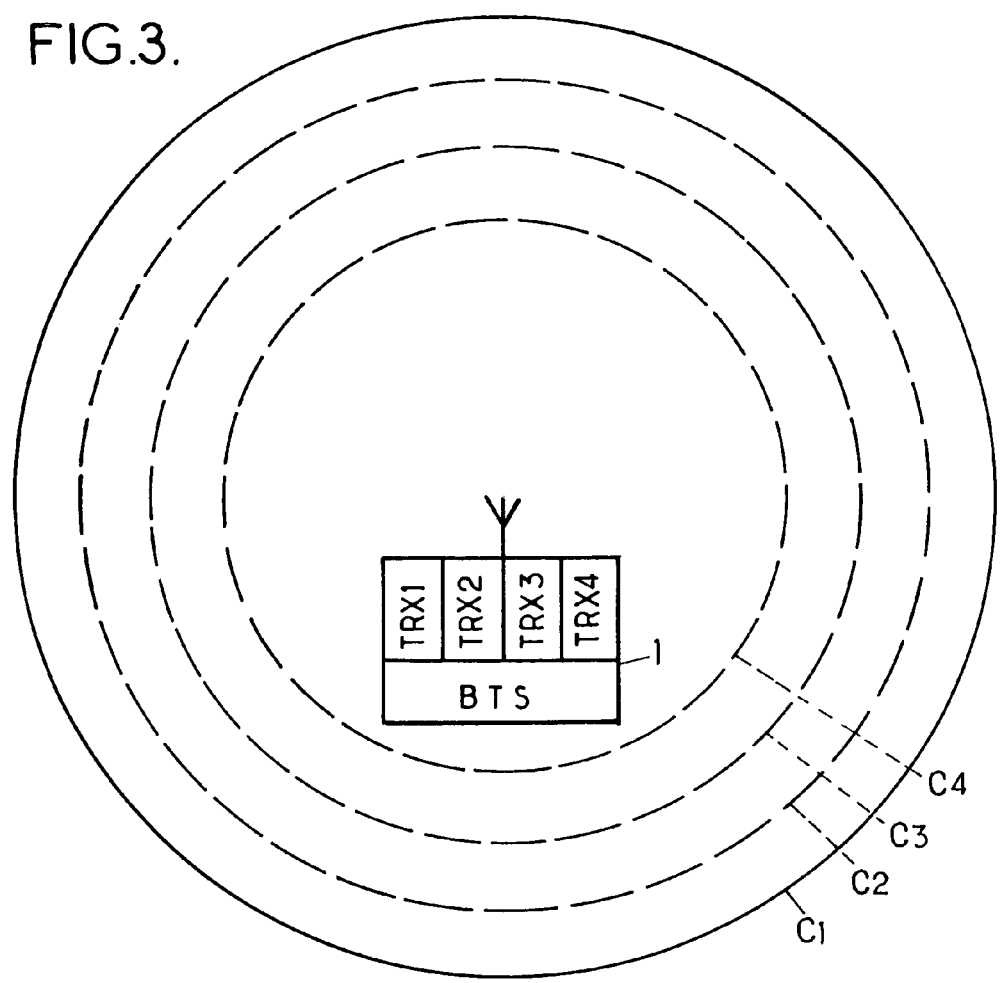
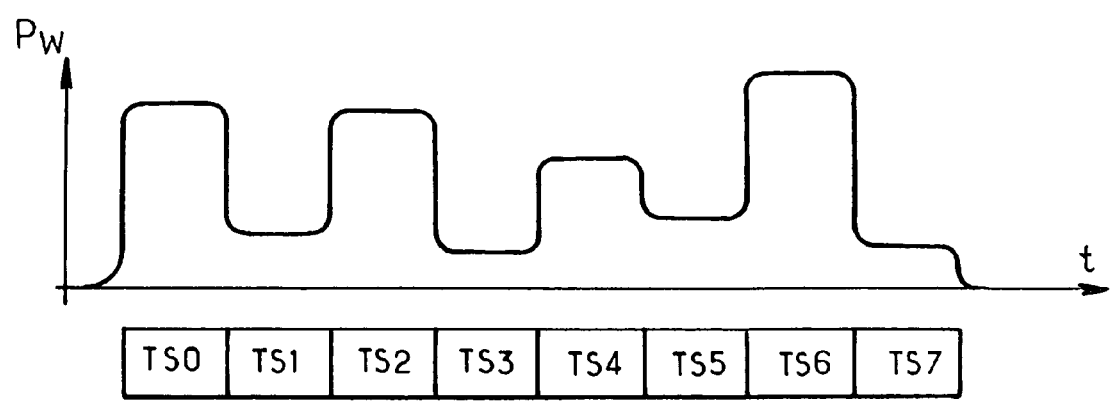
FIG.5.

METHOD AND APPARATUS FOR SELECTING PARAMETERS IN A CELLULAR RADIO COMMUNICATION NETWORK

BACKGROUND OF THE INVENTION

The invention relates to the management of the radio resources used in cellular mobile radio communication networks.

Cellular networks comprise base stations to serve the mobile stations located in the different cells. Each base station has a limited range, and is allocated only one part of the radio resources made available to the network operator. These resources are reused in other cells to optimise the communication capacity offered by the network. This reuse results in a risk of interference between distinct communications sharing the same resources.

Various radio resource management procedures can be applied, depending on the operator's choice, in the infrastructure of the cellular network in order to optimise the use of the frequencies and to minimise interference. The following may be cited:

power control procedures which limit the transmitted radio power when the propagation conditions between a base station and a mobile station are relatively good;

resource allocation procedures within each cell, which may follow various "tiering" strategies for limiting interference or allowing for greater reuse of certain channels;

automatic channel transfer procedures within the same cell (intra-cell handover), which change the channels allocated to communications undergoing interference;

automatic transfer procedures between cells when communication is in progress (inter-cell handover), which provide the continuity of communication when a mobile terminal moves and changes cell;

frequency-hopping procedures which provide frequency diversity of the interferers;

dynamic channel allocation procedures, by means of which the sets of frequencies employed in the cells can be adapted to the interference conditions or the traffic conditions observed; etc.

A good number of these procedures call upon parameters which are compared to quantities measured by the base stations or the mobile stations in order to take decisions or determine a command.

For example, in the case of power control, the attenuation applied is an increasing function of the power level sensed on the radio link, a comparison parameter serving to characterise this increase and/or to set a power threshold below which no attenuation is imposed. In general, the inter-cell handover algorithms also use a power threshold below which they force a change of the attachment cell of the mobile station.

To optimise the whole arrangement, the network operator must, cell by cell, set suitable values for those management parameters, which raises a number of difficulties:

the number of applied procedures and cells, and hence the number of parameters to be set, can be high, which often leads to adopting default values which are not well-suited to the local characteristics of the network;

the choice of a parameter is not always intuitive, which also favours the adoption of default values;

an empirical choice, even by a highly experienced installer, may turn out to be poorly suited due to the complexity of the radio propagation mechanisms;

the relevance of the choice of a parameter is often highly sensitive to the choices made in the adjacent cells, or for other parameters of the same procedure or of different procedures;

when the radio environment is modified (addition, suppression, or breakdown of a base station or simply of a transceiver unit, ongoing change in the propagation conditions in the vicinity of a base station, etc.), the choice of parameters should be revised in the cell concerned, or even in a number of adjacent cells. In practice, this is generally not done due to the complexity of the task.

An object of the present invention is to overcome at least some of the difficulties described heretofore. Another object is to simplify the choice of values for the radio resource management parameters used in the infrastructure of a cellular network. Another object is to render such a choice better adapted to the local characteristics of the cells.

SUMMARY OF THE INVENTION

The invention thus proposes a method of selecting the value of at least one radio resource management parameter employed by base station control units of a cellular radio communications network. For each base station serving mobile stations in a cell, values are obtained of at least one quantity based on measurements made on radio channels in the cell, this quantity being compared to at least one associated parameter in a procedure for managing the radio resources allocated to the mobile stations. According to the invention, a statistic is maintained of the values obtained for said quantity, and the value of said associated parameter is adapted for the cell in such a way that, according to the statistic, a determined fraction of the values obtained of said quantity are greater than the value of the associated parameter.

By means of the statistical distributions of the quantities deduced from the measurements, the method "learns" characteristics of the network, which may be pertinent in respect of one or more radio resource management procedures. Defining in relation to this distribution the values of parameters of these procedures, e.g. comparison thresholds, greatly simplifies the operator's parametering task.

Definition by means of a predetermined fraction of the values taken into account in the statistics will often be more intuitive than the direct choice of an absolute value of the parameter.

For example, in the case of power control, it is known that it is desirable not to impose attenuation on 10% or 20% of the calls experiencing the worst reception conditions. The quantity forming the object of the statistic may therefore be the power level, or, more generally, a quantity correlated to the channel-to-interferer ratio, and for the power control a threshold will be adopted which corresponds to 10% or 20% of the worst values of this quantity.

Adaptations of the same type may also be effected for parameters involved in the handover procedures, the procedures for selecting the radio channels allocated to communications, etc.

The quantities subjected the statistic can be determined on the basis of measured power or quality levels, or of estimates of the channel-to-interferer ratio, downlink (from the base stations to the mobile stations) and/or uplink. The quantity may likewise depend on the distance between the base station and the mobile station, evaluated on the basis of the propagation delay of certain signals.

To improve the uplink reception quality, the manufacturers of cellular network infrastructures have conceived a certain number of methods based on diversity or signal processing techniques. These techniques cannot in general be used at the level of the mobile stations. The present invention allows for an improvement in both directions of communication. Depending on the situation, the improvement may be greater in the uplink or in the downlink. Taking account of the methods already available for improving the uplink reception, it may be advantageous to give priority to the downlink in the implementation of the present invention. To achieve this, the measurements used to obtain the quantity subjected to the statistic, on the basis of which the value of the parameter is determined, will preferably be the measurements made by the mobile stations.

For certain procedures, particularly for inter-cell handover procedures, it is judicious for the statistic of the values obtained for the quantity deduced from the measurements to relate to the first measurements obtained on a dedicated signalling channel for each mobile station spontaneously accessing the cell. This allows the statistic to provide a faithful reflection of the radio coverage of the cell, while avoiding to take account of the measurements relating to the mobile stations of which the access to the cell, or the persistence in the cell, would not be spontaneous but would result from an artificial handover or other procedure.

Another aspect of the present invention relates to a control unit for at least one base station of a cellular radio communications network, comprising means for performing management procedures of radio resources allocated to communications between the base station and mobile stations in a cell served by said base station, and means for selecting, in accordance with a selection method as defined hereabove, the value of at least one parameter used in at least one of these procedures.

BRIEF DESCRIPTION OF THE DRAWINGS

FIG. 3 is a schematic representation of a cell in which a particular procedure for choice of allocated radio channels has been applied;

FIG. 5 is a diagram illustrating another procedure for the choice of channel allocation.

DESCRIPTION OF PREFERRED EMBODIMENTS

Figure 1:
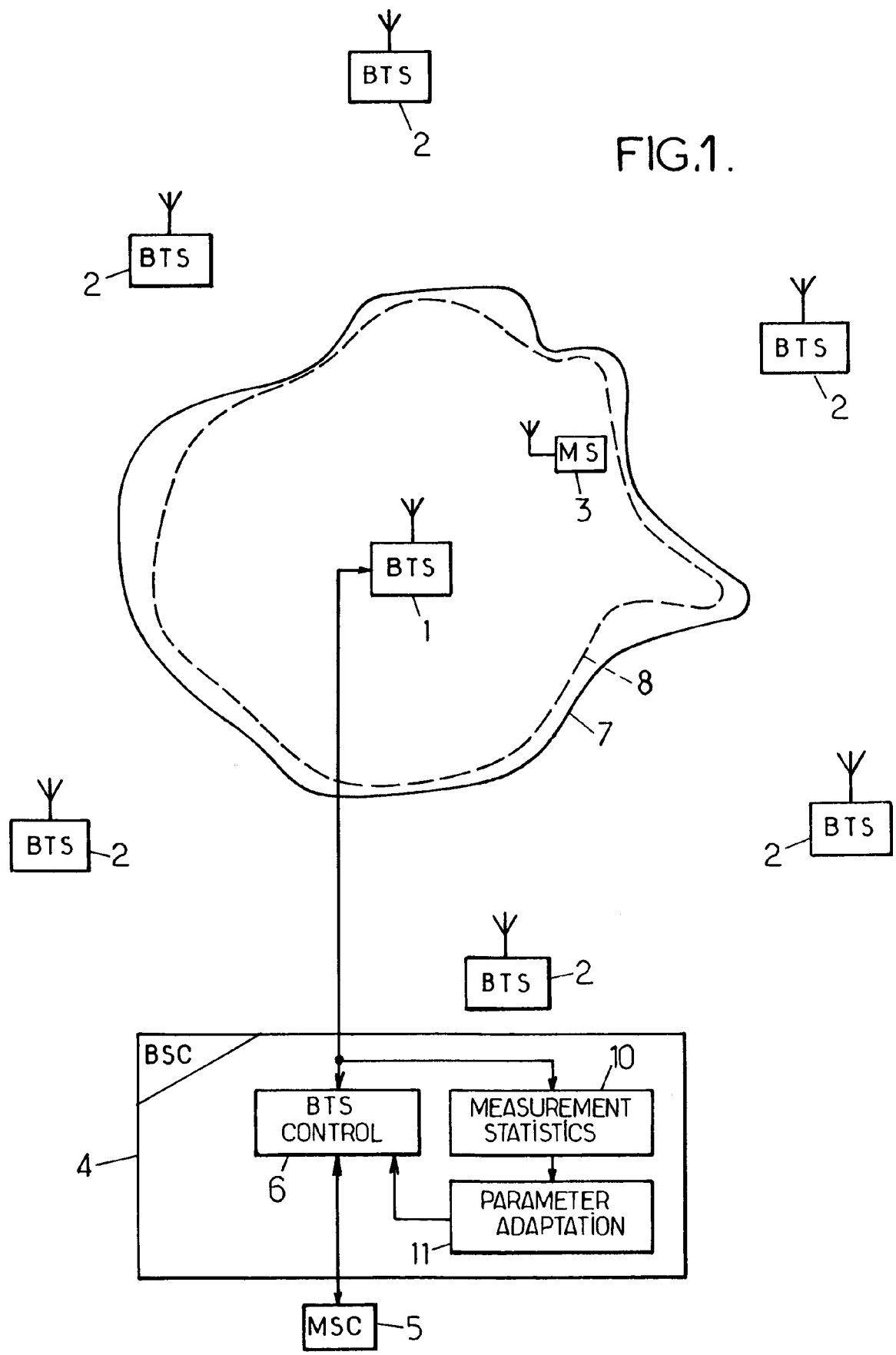
FIG. 1 is a schematic representation of the access system to a cellular radio network.

The infrastructure of a cellular network such as that represented in FIG. 1 comprises base stations (BTS) 1, 2, distributed over the geographical cover area of the network. The base stations procure radio links with the mobile stations (MS) 3, which are located within their range. They are also linked to an access system comprising base station controllers (BSC) 4 and mobile service switching centres (MSC) 5, which provide the interface with the fixed networks. Each BTS 1 depends on a BSC 4, but each BSC may supervise several BTS. For each BTS 1 which it supervises, the BSC 4 comprises a control software module 6, which carries out a certain number of radio resource management procedures for the cell served by this BTS.

The method according to the invention is described hereinafter in relation to the base station 1. It is understood that this may also be applied in a similar manner for each of the other base stations 2. In schematic manner, the contour 7 drawn in FIG. 1 designates the limit of the cell served by the BTS 1. Beyond this limit, it is an adjacent BTS 2 which serves the mobile stations.

The mobile stations 3 active within the cell periodically carry out measurements on the radio signals emitted by the BTS 1 on the downlink channels. These measurements are effected on a beacon frequency assigned to the cell when the mobile is not in communication, or on the traffic or signalling channels. In addition, when a mobile station communicates with the BTS, the latter effects measurements on the signals which it receives.

In the specific case of GSM networks, which will be considered hereinafter by way of example, the measurements effected are described in Recommendation GSM 05.08 published by the ETSI (European Telecommunications Standards Institute), to which reference may be made. These measurements include:

the downlink power level sensed by the mobile 3, averaged by periods of 480 ms and coded on 6 bits by a quantity RXLEV_DL. The values of RXLEV_DL are increased by one unit per decibel of the measured power P (RXLEV_DL=0 if P<−103 dBm, RXLEV_DL=1 if −103≦P<−102 dBm, . . . , RXLEV_DL=63 if P≧−41 dBm);

the downlink quality level, coded on 3 bits by a quantity RXQUAL_DL calculated on the basis of estimates of the bit error rate (BER) observed on the downlink by means of the channel equaliser or of the convolutional decoder of the mobile 3 (RXQUAL_DL=0 if BER<0.2%, RXQUAL_DL=1 if 0.2%<BER<0.4%, RXQUAL_DL=2 if 0.4%<BER<0.8%, RXQUAL_DL=3 if 0.8%<BER<1.6%, RXQUAL_DL=4 if 1.6%<BER<3.2%, RXQUAL_DL=5 if 3.2%<BER<6.4%, RXQUAL_DL=6 if 6.4%<BER<12.8%, RXQUAL_DL=7 if BER>12.8%);

the uplink power and quality levels measured by the BTS 1, and coded by two quantities RXLEV_UL and RXQUAL_UL defined in the same manner as for the corresponding downlink quantities RXLEV_DL and RXQUAL_DL;

power levels which the mobile stations 3 sense from other BTS 2 on the beacon frequencies assigned to the adjacent cells. Each of these levels is coded on six bits by a quantity RXLEV_NCELL(n) in the same manner as for the quantity RXLEV_DL;

a distance (in the meaning of radio propagation) between the BTS and the mobile station, which the BTS 1 evaluates on the basis of the reception delay of the radio signal sent by the mobile 3 with respect to the signal transmission by the BTS.

The measurements made by the mobile station 3 are transmitted on the radio interface in a message called MEASUREMENT_REPORT. The BTS 1 retransmits these measurements to the BSC 4 in a message called MEASUREMENT_RESULT, appending the measurements which it has made itself. The whole of these measurements is exploited by the BSC 4 in the context of the radio resource management procedures used in the cell.

According to the invention, at least part of these measurements are also supplied to a statistical calculation module 10, which analyses the occurrence frequencies of the different possible values of one or several quantities which depend on it.

In the exemplary architecture shown in FIG. 1, the statistical calculation module 10 is located in the BSC 4, and intercepts the MEASUREMENT_RESULT messages transmitted on the interface (A-bis) between BTS 1 and BSC 4. The BSC comprises another module 11, which carries out the adaptation of the different parameters used by the module 6 supervising the BTS 1, with the aid of the statistics maintained by the module 10. Alternatively, the modules 10 and/or 11 could be located in the base stations.

The GSM systems combine frequency division multiple access (FDMA) and time division multiple access (TDMA). One of the timeslots in each frame on the beacon frequency of each base station is used to provide a control channel (BCCH). The other timeslots can be allocated as traffic channels. The BTS is generally provided with other frequencies to provide traffic channels. To access the network, a mobile which is active in the cell issues an access request on a random access channel (RACH) associated with the BCCH, after which the base station allocates to it a dedicated bidirectional signalling channel (SDCCH) on which various signalling elements are exchanged.

The measurements referred to heretofore are made by the base station 1 and the mobile stations 3 a soon as a dedicated signalling channel is allocated. Advantageously, the measurements, on the basis of which the module 10 makes the statistical calculations, are limited to the first measurements obtained on the SDCCH channel for each mobile station spontaneously accessing the cell. This procures a limited number of measurement samples, but these provide a good representation of the effective radio coverage within the cell. Indeed, it avoids the statistics being influenced by the effects of the handover algorithms applied in the cell or in adjacent cells.

Figure 2:
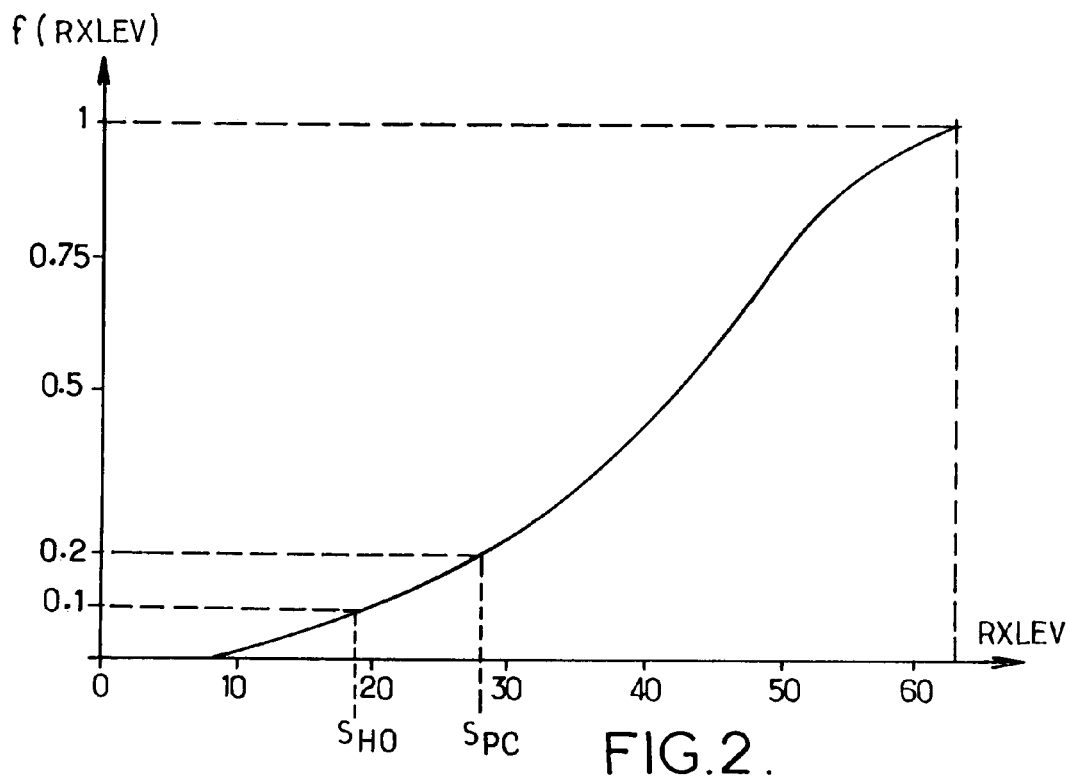
FIG. 2 is a graph showing an example of the distribution function of a measured power level, and illustrating its exploitation in power control and handover procedures.
Figure 4:
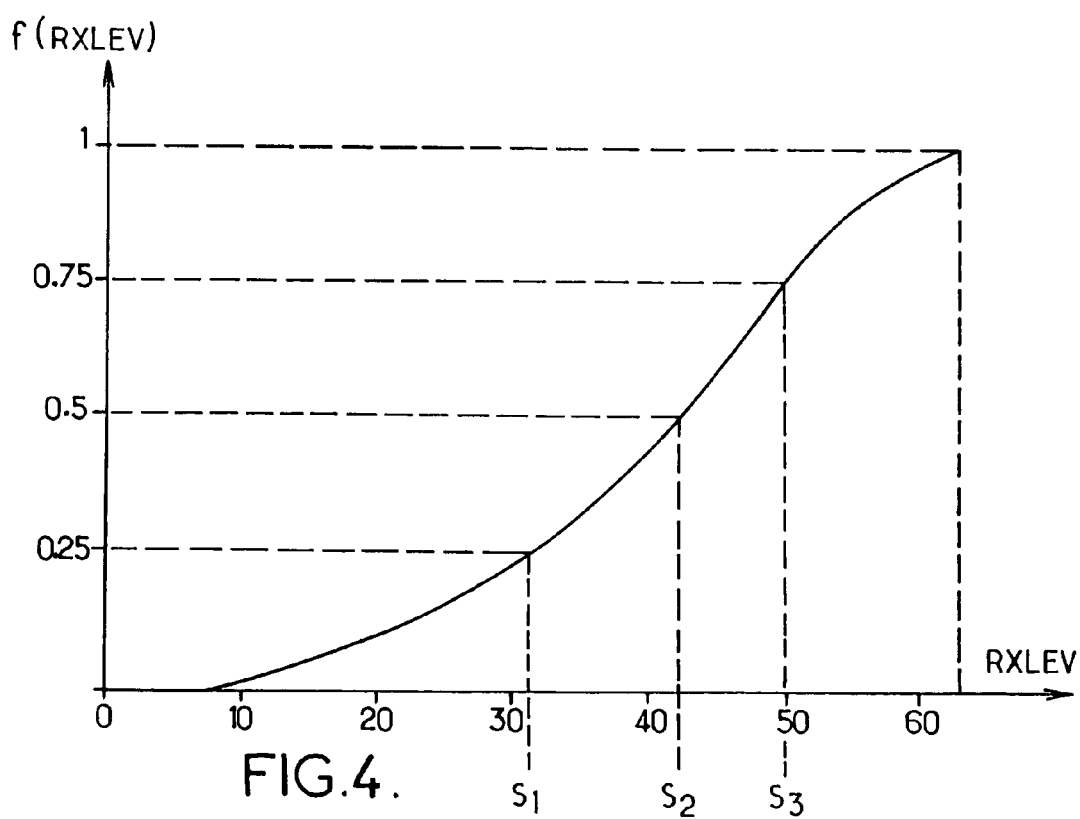
FIG. 4 is a graph similar to that of FIG. 2, illustrating the determination of the thresholds used in the procedure applied in the cell of FIG. 3.

The module 10 calculates the distribution function of one or more quantities obtained on the basis of the measurement results. The curve in FIGS. 2 and 4 shows an example of the distribution function thus calculated, in the case where the quantity in question is the quantity RXLEV representing a sensed power level (RXLEV_UL, RXLEV_DL, or a combination of the two). The value f(RXLEV) of the distribution function, for a certain value RXLEV, represents the probability of observation of a value at most equal to RXLEV among the values deduced from the measurements actually made. The curve obtained by derivation represents the probability density of the quantity.

In order to obtain a distribution function such as that represented in FIGS. 2 and 4, a simple count is made of the values derived from the measurements.

The module 10 has, for example, a counter N(x) for each possible value x of the quantity being analyzed. If a measurement sample gives a value y, it increments by one unit the counters N(x) with $x \leq y$. The distribution function is given by $f(x)=N(x)/N(x_{max})$, where $x_{max}$ is the highest possible value of x. When $N(x_{max})$ attains a certain overflow value, the module 10 divides all the counters N(x) by a renormalisation factor. The overflow value and the renormalisation factor are chosen as a function of the period which it is intended should be taken into account in the statistic.

The module 10 could also calculate the probability density with occurrence counters for each value, and to deduce from this the distribution function.

Curves of the type represented in FIGS. 2 and 4 are used by the module 11 to adaptatively determine the thresholds used in certain radio resource management procedures.

For example, the control module 6 of the BSC can apply, for communications involving its BTS 1, a power control algorithm using the following recursive formula to determine the attenuation which should be applied in successive time windows:

$$TXPWR_n = \max\{0, kx(RXLEVAV_{n-1}+TXPWR_{n-1}-S_{PC})\} \quad (1)$$

where:

$TXPWR_n$ is the attenuation factor, expressed in dB with respect to the maximum power, used in the uplink and/or in the downlink in the n-th time window;

k is a compensation factor between 0 (no power control) and 1;

$RXLEVAV_{n-1}$ is the value of a power level RXLEV averaged on the (n−1)-th time window, expressed in dBm or in RXLEV units;

$S_{PC}$ is a threshold expressed in the same units as the quantity $RXLEVAV_{n-1}$.

In the expression (1), $RXLEV_0=RXLEVAV_{n-1}+TXPWR_{n-1}$ represents the field strength which would have been received in the absence of power control. At each iteration of the algorithm, i.e. after each averaging window, the attenuation is recalculated. Under stable conditions, the attenuation factor is equal to $k \times (RXLEV_0-S_{PC})$ if $RXLEV_0 \geq S_{PC}$, and equal to 0 dB if $RXLEV_0 \leq S_{PC}$. This calculation can be carried out separately for the uplink (averaging RXLEV_UL) and for the downlink (averaging RXLEV_DL).

It is known empirically that this power control algorithm is optimum when only about 20% of the communications are at maximum power, i.e. when the 80% of the best communications are the object of a power limitation forced by the algorithm (TXPWR>0 dB). In general, the maximum power is required for communications with the mobiles furthest away from the base station, for which the received field is the weakest (the mobiles located between the contours 7 and 8 in the schematic representation of FIG. 1). These are approximately the 20% worst cases in the statistic for radio-electric coverage of the cell.

The threshold $S_{PC}$ from the expression (1) can therefore be defined on the basis of the distribution function f (RXLEV), as indicated in FIG. 2. This is the value for which the distribution function is valued at 0.2 ($S_{PC}=28$ in the example of FIG. 2, hence a power of −75 dBm). In practice, the threshold $S_{PC}$ may in general be chosen in the range $10\% \leq f(S_{PC}) \leq 20\%$.

The handover algorithms executed by the BSC use a number of thresholds which may be adapted in a similar manner.

For example, too low a field strength is generally a cause of handover. If the parameter RXLEV_DL or RXLEV_UL measured in the course of communication falls below a threshold $S_{HO}$, the BTS issues a command to the mobile station to change cell, generally for connection to the adjacent cell for which the sensed power level RXLEV_NCELL(n) is the highest.

It is judicious for the threshold $S_{HO}$ to be smaller than the threshold $S_{PC}$, in order to avoid the forcing of handovers due to insufficient power in the case of mobiles which would not be at maximum power. In the example of FIG. 2, the threshold SHO is chosen by the module 11 as corresponding to the value of RXLEV such that f (RXLEV)=10% ($S_{HO}$=19, hence a power of −84 dBm).

The choices of the parameters $S_{PC}, S_{HO}, \ldots$ are modified automatically by the modules 10 and 11 when certain modifications occur in the radio environment, including the situation of a new neighbouring base station being added. The adaptation produces new values after convergence of the statistic.

The statistics effected by the module 10 can likewise be used in the context of procedures for selecting the channels which are to be allocated to communications being established.

By way of example, certain operators adopt strategies of the "concentric cell" type, according to which the FDMA frequencies are allocated to communications in a manner which depends on the signal strength.

FIG. 3 provides an illustration of this in a specific case. In this schematic example, BTS 1 comprises M=4 transceiver units TRX1–TRX4, associated respectively with different carrier frequencies. The unit TRX1 is associated with the beacon frequency and functions at maximum power without frequency hopping to ensure the required coverage. The other units TRX2–TRX4 are used for traffic channels, and they are allocated frequency numbers (ARFCN in the GSM terminology) if there is no frequency hopping, or identification numbers of a hopping sequence (MAIO).

The purpose of the unit TRX4 is to transmit at the weakest power, i.e. preferably for mobiles which are located in the area delimited schematically by the circle C4 in FIG. 3. The unit TRX3 preferably transmits at slightly higher power, a priori for mobiles which are located in the area delimited schematically by the circles C4 and C3. The unit TRX2 preferably transmits at a still higher power, a priori for mobile stations located in the area delimited schematically by the circles C3 and C2. The unit TRX1, functioning on the beacon frequency at maximum power, serves a priori for the "worst" mobiles (between the circles C2 and C1). In practice, it is clear that the preferential service areas for the TRXm units are not circular.

This type of allocation strategy allows for the reuse of frequencies to be optimised, adopting a reuse pattern which is the smaller for a given frequency, the weaker the transmission power is on this frequency.

In order to decide to allocate a given communication frequency to a mobile station, or a given transceiver unit TRXm, one possibility is to compare the power level RXLEV detected by the mobile from the base station (or by the base station from the mobile, or a combination of the two) with decision thresholds $S_1, S_2, S_3$ defined by the module 11 on the basis of the distribution function determined by the calculation module 10.

FIG. 4 illustrates this determination of the thresholds $S_1, S_2, S_3$ which correspond respectively to the values 25%, 50%, and 75% of the distribution function ($S_1$=31, $S_2$=42, and $S_3$=50 in the example represented, that is respectively −7,2 dBm, −61 dBm, and −53 dBm). For each mobile to which a channel is to be allocated, if RXLEV<$S_1$ (25% worst cases), the beacon frequency (unit TRX1) will be retained, because the power will be maximum if an available timeslot remains on this frequency. If all the timeslot are occupied by the unit TRX1, the algorithm will search to determine whether a timeslot is available on the unit TRX2, then on the unit TRX3, and so on. If $S_1 \leq$ RXLEV<$S_2$, the frequency of the unit TRX2 will be allocated for preference. If $S_2 \leq$ RXLEV<$S_3$, the frequency of the unit TRX3 will be allocated for preference. And if RXLEV$\geq S_3$ (25% best cases), the frequency of the unit TRX4 will be allocated for preference.

In the general case of a BTS with M transceiver units, each threshold $S_m (1 \leq m \leq M-1)$ is defined on the basis of a fraction of the form 100×m/M % in the foregoing procedure, i.e. f($S_m$)=100×m/M %.

In the case of failure of a TRXm unit, the relevant thresholds $S_m$ are easily modified. It is sufficient to reduce the number M by one unit for the module 11, after convergence of the statistics, to select new adequate values.

This communication channel selection strategy can have numerous variants.

In one of these, two reuse patterns only are used; one for the beacon frequencies and the other, smaller in size, for the other frequencies. In other words, only the threshold $S_1$ (with f($S_1$)=100/M %) is used to decide whether a mobile will communicate on the beacon frequency (unit TRX1) or on another frequency in each cell (unit TRXm, with $2 \leq m \leq M$).

As with the previous technique, this procedure for selecting the frequencies to be allocated has the advantage of preferentially confining the transmissions with the highest energy to the frequencies which are the least reused.

Such a procedure can clearly be applied irrespective of the TRXm units, taking account simply of the frequency to be allocated.

Furthermore, the strategy of allocated channel selection can also be applied to the TDMA timeslots, and not only to the FDMA frequencies.

FIG. 5 provides an illustration of this. The lower part shows the division into eight timeslots TS0–TS7 of the TDMA frame on a given carrier frequency, and the upper part diagrammatically shows the desired profile of the transmitted power PW over these timeslots.

In this example, the allocation procedure of the timeslot TSi attempts to allocate the timeslots of even rank i to the communications of relatively high energy (mobile distant from the base station) and the timeslots of odd rank i to the communications of lower energy (close mobile). This type of allocation strategy, implemented in an cluster of adjacent cells, allows for the average co-channel interference level to be reduced. If the base stations are synchronised, it is possible to permute the role of the even-numbered and odd-numbered timeslots for an adjacent cell reusing the same frequency, whereby interference between the most energetic communications in the two cells can be avoided. In the case of asynchronous networks, the procedure reduces the average level of co-channel interference by limiting the average duration of transmission at high power.

In order to implement such a timeslot allocation procedure, the power level sensed by a mobile from the BTS or by the BTS from the mobile (or a combination of the two) is compared to a threshold $S_{TS}$, allowing a preferential allocation over an odd or even timeslot(as available). This threshold $S_{TS}$ is advantageously defined with the aid of the distribution function of the associated measured quantity (f ($S_{TS}$)=50% in the example under consideration).

It is noted that the statistics kept by the calculation module for each cell can be global with regard to the cell, or differentiated according to different sub-units or different sub-assemblies of resources used in the cell.

For example, in the case of the BTS 1 represented in FIG. 3, the module may retain, on the one hand, a global statistic for the cell being served, and, on the other M similar statistics established respectively on the basis of the measurements made in relation to the mobiles assigned to the different transceiver units TRX1–TRX4. The global statistic serves to define the frequency choice thresholds $S_1$–$S_3$ as disclosed with reference to FIG. 4, such that the M statistics relating to the transceiver units can be used to select the threshold $S_{TS}$ called upon by the timeslot allocation procedure described with reference to FIG. 5.

In the foregoing examples, the quantity which is subjected to the statistic maintained by the module 10 is deduced from the field strength measurements RXLEV, made by the mobile stations or the base stations. It is possible to deduce these quantities from the other measurements reported in the message MEASUREMENT_RESULT (RXQUAL, DISTANCE, etc.). The quantity in question can also be a combination of one or more of these different measurements made in one or more directions of communication. Its precise choice depends on what was judged adequate for the optimisation of the procedure, whose parameters are adapted according to the invention.

In addition, the same radio resource management procedure can call upon statistics of different quantities maintained by the module 10. For example, certain intra-cell handover algorithms provide that, if a communication experiences a relatively high RXLEV and simultaneously a relatively low RXQUAL (good propagation but with the probable presence of an interferer on the same channel), the channel allocated to this communication can be modified. It is possible to envisage the corresponding thresholds on RXLEV and on RXQUAL to be defined with the aid of the distribution functions of these quantities calculated by the module 10.

An interesting quantity to be used in a number of radio resource management procedures is the channel-to-interferer ratio. If this ratio is available, it is possible advantageously to maintain a statistic thereof and to make use of it instead of the RXLEV quantities in each of the procedures described heretofore.

The channel-to-interferer ratio is not directly measurable, or only with great difficulty. In the uplink, the base station can evaluate it by various known techniques of analysis of the received radio signal. In the downlink, an evaluation scheme based on a comparison between the reception level by the mobile station of a signal transmitted by the base station and the reception levels by the same mobile station of signals transmitted on the beacon frequencies by the base stations of a group of adjacent cells, has been proposed in French Patent Application 97 11467.

In this scheme, the downlink channel-to-interferer ratio CIR is evaluated by the ratio between the downlink sensed power level, represented by RXLEV_DL, and the sum of the power levels measured from the adjacent cells, represented by RXLEV_NCELL(n). The measurement RXLEV_DL must be corrected, if appropriate, in order to take account of the power control. In the present case, since the statistics relate to the first measurements acquired on the SDCCH channel for which no power control is applied, this correction is not useful.

The evaluation of the channel-to-interferer ratio CIR can be effected by the module 10 on the basis of the measurements received in the message MEASUREMENT_RESULT, which contains at most six RXLEV_NCELL(n) measurements relating to the six beacon frequencies received with the highest energy by the mobile from adjacent cells, among a list of frequencies to be monitored which the BTS 1 signals to the mobiles on the BCCH channel:

$$CIR = \frac{P\_DL}{\sum_{n=1}^{6} g(n) \times P\_NCELL(n)} \quad (2)$$

where the powers are given by $P\_DL = 10^{RLEV\_DL/10}$ and $P\_NCELL(n) = 10^{RXLEV\_NCELL(n)/10}$, and $g(n)$ is a weighting coefficient dependant on the colours of the adjacent cells in the reuse pattern of the traffic channels. If the adjacent cell n is of the same colour as the serving cell of the mobile, then $g(n)=1$. Otherwise, the coefficient $g(n)$ takes account of the protection of the adjacent channels, which is at least 18 dB in GSM, i.e. $g(n)=0.016$.

This CIR estimate is characteristic of the radio-electric position of the mobile and represents the real behaviour of the network when loaded. The CIR estimate is the more reliable, the smaller the reuse pattern becomes, and the greater the load. In order to take account of this, it is possible to provide that the module 10 only evaluates the statistic of the CIR quantity in the circumstances in which the network is locally loaded, e.g. at peak time.

Figure 6:
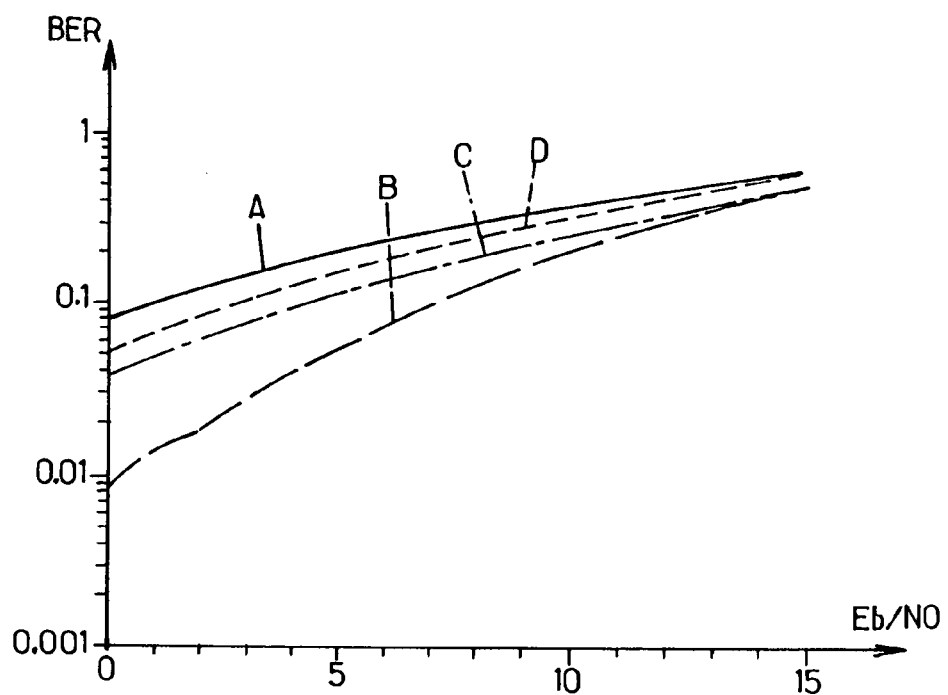
FIGS. 6 and 7 are graphs showing the improvement in reception in the uplink and downlink, obtained by applying the invention to a procedure of choice of allocated radio channels.
Figure 7:
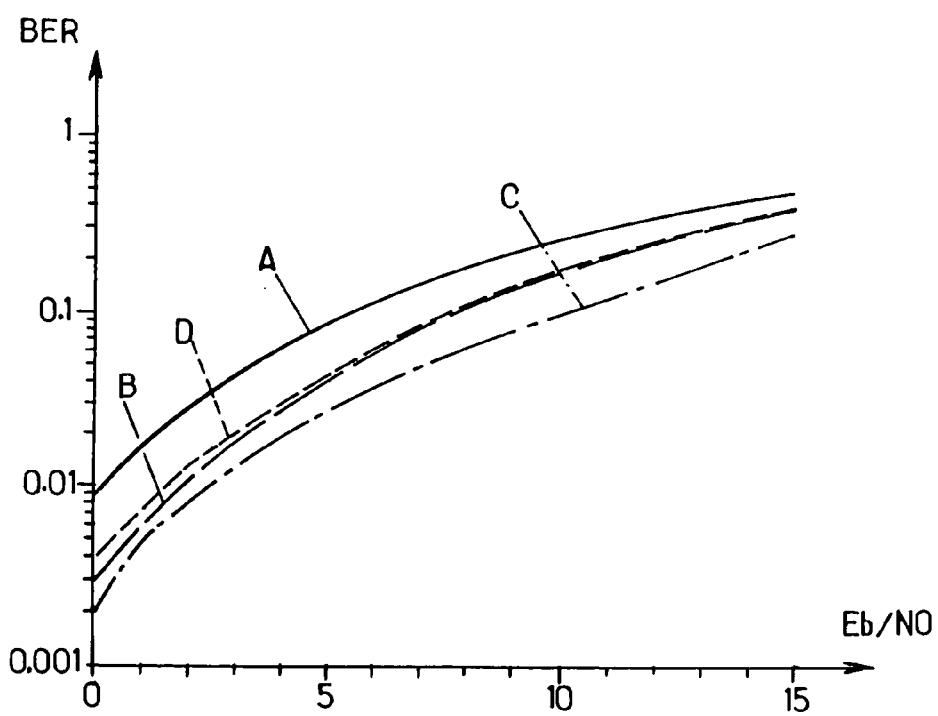

The graphs in FIGS. 6 and 7 show the results of simulations carried out to assess the gain obtained by the method according to the invention. In the example simulated, the cellular network of the GSM type uses base stations with omni-directional antennae without power control, with a traffic load of 70%, and a reuse pattern of 3 cells for the traffic channels and 12 cells for the BCCH channels (four carriers per cell). The reference curves A correspond to the case where the carriers are randomly allocated, the invention not being applied. For the other curves B,C,D, the allocation of the frequency channels was such that 25% of the communications for which the conditions were worst were effected for preference on the BCCH frequency (reused in a pattern of 12), the others being randomly allocated a channel on another carrier (reused in a pattern of 3). The curves show the dependency between the ratio Eb/N0 (energy per bit over noise power) and the binary error rate BER, in the uplink for FIG. 6 and in the downlink for FIG. 7.

The curves B correspond to the case where the quantity used to decide on the frequency to be allocated, and of which the statistic serves to define the corresponding threshold $S_1$, is the power level RXLEV_UL. For the curves C, this quantity is the signal-to-interferer ratio CIR, evaluated on the downlink according to formula (2). For the curves D, it is the distance evaluated by the BTS on the basis of the uplink reception delay with respect to the downlink signal. The substantial gains may be noted which are achieved by the implementation of the invention. These gains are not identical in both communication directions, and depend on the quantities used, which allows for different optimisation strategies to be used depending on the particular features of the network.

What is claimed is:

1. A method of selecting the value of at least one radio resource management parameter employed by base station control units of a cellular radio communications network, wherein, for each base station serving mobile stations in a cell, values are obtained of at least one quantity based on measurements made on radio channels in the cell, said quantity being compared to at least one associated parameter in a procedure for managing the radio resources allocated to the mobile stations, the method comprising the steps of:

maintaining a statistic of the values obtained for said quantity, and adapting the value of said associated parameter for the cell in such a way that, according to the statistic, a determined fraction of the values obtained of said quantity are greater than the value of the associated parameter.

2. A method according to claim 1, wherein said measurements on radio channels in the cell comprise measurements of a reception level of radio signals transmitted in at least one direction between the base station and mobile stations.

3. A method according to claim 1, wherein said measurements made on radio channels in the cell comprise quality measurements of the reception of radio signals transmitted in at least one direction between the base station and mobile stations.

4. A method according to claim 1, wherein the obtaining of said quantity comprises estimating a channel-to-interferer ratio at the base station or at each mobile station.

5. A method according to claim 1, wherein said measurements are made by the mobile stations.

6. A method according to claim 4, wherein said measurements are made by the mobile stations, and wherein the estimation of a channel-to-interferer ratio at a mobile station comprises a comparison between a reception level, by the mobile station, of a signal transmitted by the base station and reception levels, by the same mobile station, of signals transmitted on beacon frequencies by the respective base stations of a set of adjacent cells.

7. A method according to claim 6, wherein said quantity is a ratio between the level of reception of said signal transmitted by the base station and a sum of the reception levels of the signals transmitted on the beacon frequencies by the base stations of the adjacent cells.

8. A method according to claim 7, wherein said sum is weighted as a function of colours of the adjacent cells in frequency reuse patterns of the network.

9. A method according to claim 1, wherein said measurements made on radio channels in the cell comprise measurements of a reception delay, by the base station, of signals transmitted by mobile stations.

10. A method according to claim 1, wherein the statistic of the values obtained of said quantity is based on first measurements obtained on a dedicated signalling channel for each mobile station spontaneously accessing the cell.

11. A method according to claim 1, wherein said quantity is compared with an associated parameter in a control procedure of the power transmitted on radio channels allocated to communications between the base station and mobile stations.

12. A method according to claim 11, wherein the power control procedure is such that only the mobile stations for which the value obtained of said quantity is greater than the selected value of a first associated parameter can be subjected to power limitation, and wherein said determined fraction is of 10 to 20% for the adaptation of the first parameter.

13. A method according to claim 12, wherein said quantity is further compared to a second associated parameter in an inter-cell handover procedure, wherein the handover procedure is such that the mobile stations for which the value obtained of said quantity is lower than the selected value of the second associated parameter are subjected to inter-cell handover, and wherein said determined fraction is lower for the adaptation of the second parameter than for the adaptation of the first parameter.

14. A method according to claim 1, wherein said quantity is compared to at least one associated parameter in a selection procedure for radio channels allocated to communications between the base station and the mobile stations.

15. A method according to claim 14, wherein the base station comprises a number M of transceiver units, one of which transmits on a beacon frequency, and wherein the radio channel selection procedure preferentially allocates channels on the beacon frequency to the mobile stations for which the values obtained for said quantity are lower than an associated parameter, the adaptation of which makes use of a determined fraction of the form 100/M %.

16. A method according to claim 14, wherein the base station comprises a number M of transceiver units, and wherein the radio channel selection procedure distributes the channels allocated to the mobile stations based on comparisons between the values obtained of said quantity for said mobile stations and M−1 associated parameters, the adaptation of which makes use of the respective determined fractions of the form 100×m/M % for $1 \leq m \leq M-1$.

17. A method according to claim 1, wherein said quantity is compared to an associated parameter in an inter-cell or intra-cell handover procedure.

18. A method according to claim 1, wherein the base station comprises a plurality of transceiver units, and wherein the statistic for the values obtained for said quantity is maintained separately for each one of the transceiver units, in order to select independently the values of the associated parameter for the different transceiver units, at least part of the radio resource management procedure being carried out for each one of the transceiver units.

19. A control unit for at least one base station of a cellular radio communications network, comprising means for performing management procedures of radio resources allocated to communications between the base station and mobile stations in a cell served by said base station, and means for selecting a value of at least one parameter used in at least one of said procedures in which values of a quantity obtained from measurements made in the cell on radio channels between the base station and the mobile stations are compared with said parameter, wherein the selection means are arranged to maintain a statistic of the values obtained of said quantity, and to adapt the value of said parameter in such a way that, based on the statistic, a determined fraction of the values obtained of said quantity are greater than the value of the associated parameter.

20. A control unit according to claim 19, wherein said measurements on radio channels in the cell comprise measurements of a reception level of radio signals transmitted in at least one direction between the base station and mobile stations.

21. A control unit according to claim 19, wherein said measurements made on radio channels in the cell comprise quality measurements of the reception of radio signals transmitted in at least one direction between the base station and mobile stations.

22. A control unit according to claim 19, wherein said quantity is obtained from an estimation of a channel-to-interferer ratio at the base station or at each mobile station.

23. A control unit according to claim 19, wherein said measurements are made by the mobile stations.

24. A control unit according to claim 22, wherein said measurements are made by the mobile stations, and wherein the estimation of a channel-to-interferer ratio at a mobile station comprises a comparison between a reception level, by the mobile station, of a signal transmitted by the base station and reception levels, by the same mobile station, of signals transmitted on beacon frequencies by the respective base stations of a set of adjacent cells.

25. A control unit according to claim 24, wherein said quantity is a ratio between the level of reception of said signal transmitted by the base station and a sum of the reception levels of the signals transmitted on the beacon frequencies by the base stations of the adjacent cells.

26. A control unit according to claim 25, wherein said sum is weighted as a function of colours of the adjacent cells in frequency reuse patterns of the network.

27. A control unit according to claim 19, wherein said measurements made on radio channels in the cell comprise measurements of a reception delay, by the base station, of signals transmitted by mobile stations.

28. A control unit according to claim 19, wherein the statistic of the values obtained of said quantity is based on first measurements obtained on a dedicated signalling channel for each mobile station spontaneously accessing the cell.

29. A control unit according to claim 19, wherein said quantity is compared with an associated parameter in a control procedure of the power transmitted on radio channels allocated to communications between the base station and mobile stations.

30. A control unit according to claim 29, wherein the power control procedure is such that only the mobile stations for which the value obtained of said quantity is greater than the selected value of a first associated parameter can be subjected to power limitation, and wherein said determined fraction is of 10 to 20% for the adaptation of the first parameter.

31. A control unit according to claim 30, wherein said quantity is further compared to a second associated parameter in an inter-cell handover procedure, wherein the handover procedure is such that the mobile stations for which the value obtained of said quantity is greater than the selected value of the second associated parameter are subjected to inter-cell handover, and wherein said determined fraction is lower for the adaptation of the second parameter than for the adaptation of the first parameter.

32. A control unit according to claim 19, wherein said quantity is compared to at least one associated parameter in a selection procedure for radio channels allocated to communications between the base station and the mobile stations.

33. A control unit according to claim 32, wherein the base station comprises a number M of transceiver units, one of which transmits on a beacon frequency, and wherein the radio channel selection procedure preferentially allocates channels on the beacon frequency to the mobile stations for which the values obtained for said quantity are lower than an associated parameter, the adaptation of which makes use of a determined fraction of the form 100/M %.

34. A control unit according to claim 32, wherein the base station comprises a number M of transceiver units, and wherein the radio channel selection procedure distributes the channels allocated to the mobile stations based on comparisons between the values obtained of said quantity for said mobile stations and M−1 associated parameters, the adaptation of which makes use of the respective determined fractions of the form 100×m/M % for $1 \leq m \leq M-1$.

35. A control unit according to claim 19, wherein said quantity is compared to an associated parameter in an inter-cell or intra-cell handover procedure.

36. A control unit according to claim 19, wherein the base station comprises a plurality of transceiver units, and wherein the statistic for the values obtained for said quantity is maintained separately for each one of the transceiver units, in order to select independently the values of the associated parameter for the different transceiver units, at least part of the radio resource management procedure being carried out for each one of the transceiver units.

* * * * *